Patented Dec. 5, 1950

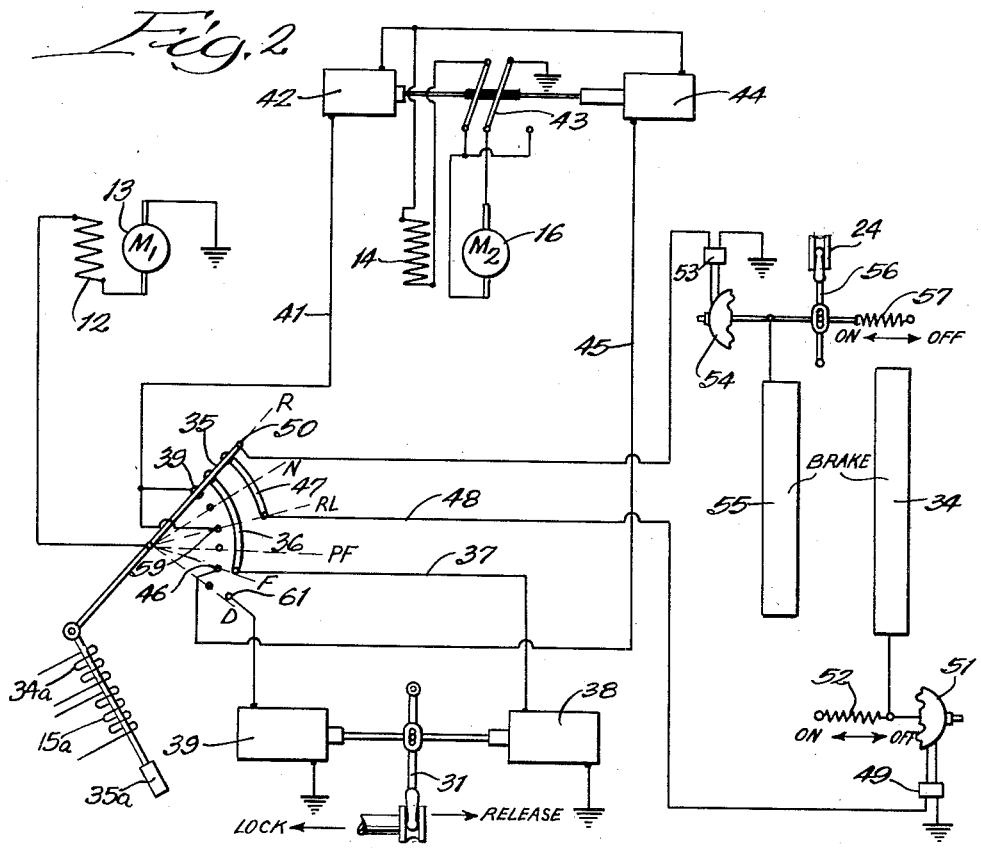

2,532,897

UNITED STATES PATENT OFFICE 2,532,897

ELECTROMECHANICALLY CONTROLLED PLANETARY TRANSMISSION

Adiel Y. Dodge, Rockford, Ill.

Application September 10, 1945, Serial No. 615,372

12 Claims. (Cl. 74—686)

This invention relates to transmissions and more particularly to variable speed and torque transmissions of the type adapted for use on automotive vehicles.

One of the objects of the invention is to provide a transmission operating at one or more fixed ratios or steps in which the torque ratio is infinitely variably changed from one such fixed ratio to another.

Another object is to provide a transmission which starts as an infinitely variable torque transmission, thereafter operates at an intermediate gear ratio and thereafter changes in infinitely variable steps from such intermediate ratio to direct drive. According to one feature of the invention, the first infinitely variable ratio may provide a regenerative operation while the second infinitely variable ratio may provide a two path non-regenerative drive.

Still another object is to provide a transmission in which a single gear set functions to produce a fixed gear ratio and operates in conjunction with infinitely variable driving means to provide both regenerative and two path non-regenerative drives. Preferably the same gear set is also utilized for reverse drive.

Still another object is to provide a transmission in which the gear set functions as a fluid clutch device to provide a direct mechanical drive.

A further object is to provide a transmission including two electric units controllable to operate with generators or motors for different driving conditions. According to one feature, a control unit serves to change the connections between the electric units and also controls other transmission elements such as brakes.

The above and other objects and advantages of the invention will be more readily apparent from the following description when read in connection with the accompanying drawing, in which—

Figure 2 is a circuit diagram of the transmission of Figure 1; and

Figure 3 is a view similar to Figure 1 of another construction.

Figure 1:
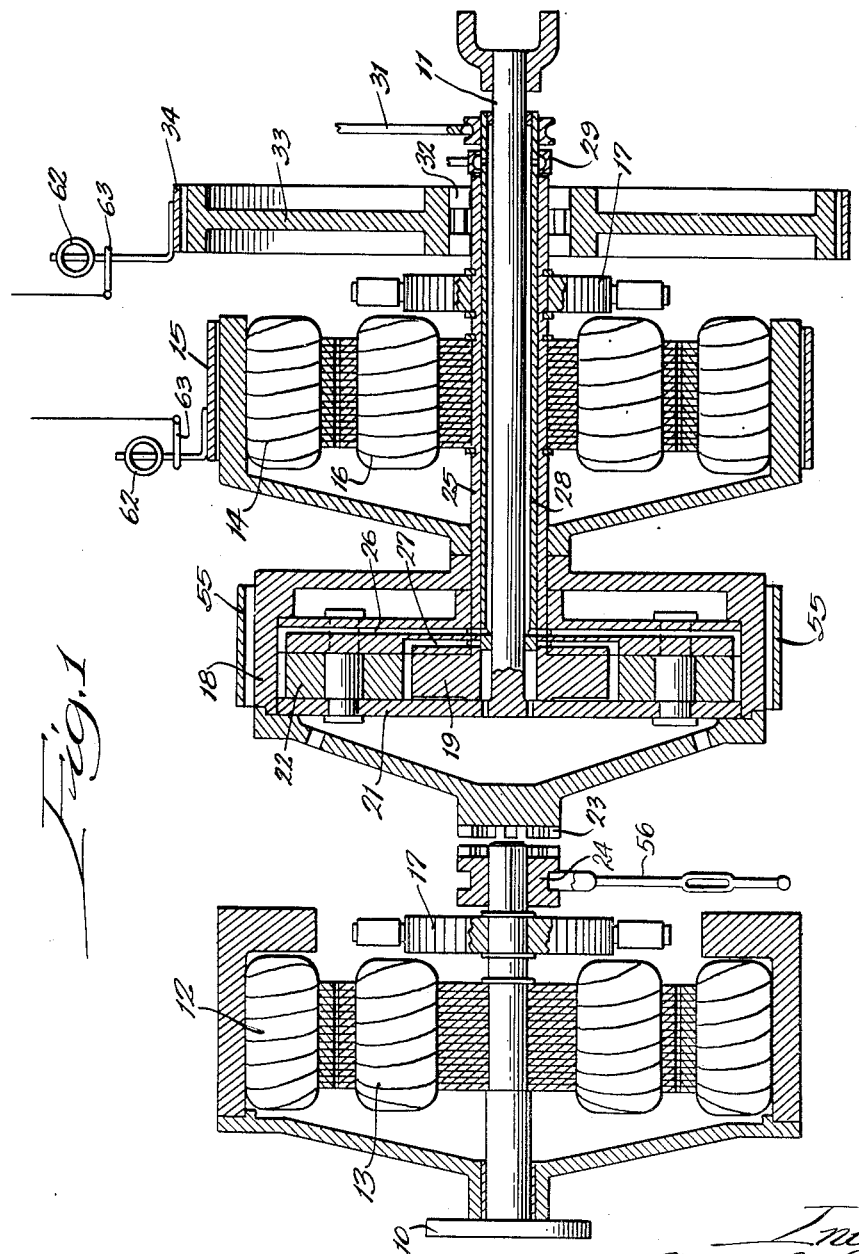
Figure 1 is a diagrammatic sectional view of a transmission embodying the invention.

The transmission illustrated in Figure 1 is adapted to connect a driving shaft 10 to a driven shaft 11 and to employ electrical means to vary the transmission ratios.

As shown, the electrical means comprises a first electric unit having a fixed field winding 12 and a rotatable armature 13 connected to the driving shaft 10. The second electric unit includes a field winding 14 mounted for rotation which is adapted to be held stationary by a brake 15. An armature 16 is rotatable in the field winding. As shown in the drawings, both of the electric units are of the series wound type with the armature winding controlled by commutators 17, although it will be understood that shunt or compound wound units might be employed equally well. Between the electric units is mounted a planetary differential gear set having a ring gear 18, a sun gear 19 and a planet carrier 21 carrying planet pinions 22 meshing with the sun and ring gears. The ring gear 18 terminates in a clutch member 23 which is adapted to be connected to the driving shaft 10 by a complementary clutch member 24 splined on the driving shaft and shiftable into and out of engagement with the clutch member 23. The sun gear 19 is connected through a sleeve 25 to the armature 16 of the second electric unit and the planet carrier 21 is connected directly to the driven shaft.

According to one feature of the invention, the planetary gear set may be so constructed as to form a fluid pump, as more particularly described in my Patent No. 2,371,227. As shown, the planet carrier is formed by plates overlying the sides of the gear teeth between which may be arranged blocking members, not shown, fitting against the ends of the teeth to form a fluid pump. One of the side plates is formed with inlet passages 26 and exhaust passages 27 communicating with the ends of the gear teeth and terminating in inlet and exhaust ports formed in the sleeve 25. The inlet and exhaust ports are controlled by a sleeve valve 28 slidable in the sleeve 25 and formed with port openings adapted to communicate with the inlet ports 26. The valve sleeve may be supplied with fluid through a collector ring 29 from any desired source of oil or the like which is preferably maintained under pressure. With the valve sleeve in the position shown, the outlet ports are closed and the inlet ports communicate with the interior of the valve sleeve so that the unit is in a locked condition. When the valve is shifted to the right through a yoke 31, the outlet ports will be uncovered and the inlet ports will be covered. At this time the liquid will be drained from the unit into the casing forming a part of the ring gear from which it may flow in any desired manner so that the unit will run freely as a gear set.

For fixed intermediate gear ratio, the sun gear 19 is adapted to be held against reverse rotation by a one-way brake 32 engaging the sleeve 25 and a brake drum 33. The brake drum 33 may be held against reverse rotation when desired by a brake 34.

The transmission, as so far described, may be controlled in the manner indicated diagrammatically in Figure 2. As shown in this figure, the field winding 12 of the first electric unit is connected to a wiper arm 35 of a control unit including the wiper arm and a series of contacts over which it is movable. As shown, the control unit includes an elongated contact bar 36 which the wiper arm is adapted to engage in a plurality of different positions and which is connected through a wire 37 to a solenoid 38. The solenoid 38 and a second solenoid 39, opposing the solenoid 38, are both connected to the yoke 31 to control the valve sleeve 28. When the solenoid 38 is energized by an engagement of the wiper arm 35 with the contact 36, the yoke 31 will be moved to the right to close the intake port and open the exhaust port of the gear unit to thus release the gears.

In the upper position of the wiper arm 35, as shown, it engages the contact 36 and a button contact 39' which is connected through a wire 41 to a solenoid 42 which is in series with the windings of the second electric unit. The solenoid 42 controls a reversing switch 43 which reverses the series relationship between the field winding 14 and the armature 16 of the second electric unit. The reversing switch is also controlled by a second solenoid 44, opposing the solenoid 42, and which is connected through a wire 45 to a button contact 46 in the control unit. In the position shown, the wiper 35 also engages a segment 47 connected through a wire 48 to a valve controlling solenoid 49. The solenoid 49, when energized, connects a diaphragm unit 51 to vacuum. The diaphragm unit 51 is connected to the brake 34 to disengage this brake, the brake normally being engaged by a spring 52 opposing the diaphragm unit when the solenoid 49 is deenergized. The wiper 35 also engages a contact 50 which is connected to a second solenoid 53, which, when energized, connects a diaphragm unit 54 to vacuum. The diaphragm unit 54 functions when connected to vacuum to engage a brake 55 with the ring gear 18 of the gear set. This unit may also be connected to a yoke 56 which shifts the clutch member 24 to disengage the clutch. A spring 57 opposes the diaphragm unit 54 to disengage the brake 55 and engage the clutch 24 when the solenoid 53 is de-energized.

The position shown with the wiper 35 at R is the reversed drive position of the transmission in which the first electric unit is driven by the driving shaft 10 to act as a generator, and the second electric unit is so connected as to turn in a reverse direction. Engagement of the brake 55 holds the ring gear 18 against rotation, and the second electric unit turns the sun gear 19 in reverse so that the gear carrier will be turned in reverse at a reduced rate of speed.

For neutral the wiper 35 is moved one step clockwise to position N in which position it engages only the contact segments 36 and 47. In this position the electric units are disconnected and the brake 34 is held disengaged. The gear elements of the gear set may, therefore, turn freely relative to each other so that no torque will be transmitted to the driven shaft. Clutch 24 may be manually disengaged by a suitable means not shown, so that a complete neutral may be had.

For regenerative low drive, the contact bar 35 is moved to the next position clockwise at RL in which it engages the segments 36 and 47 and a contact button 59 which is connected to the wire 41. The clutch 24 is also engaged to connect the driving shaft 10 to the ring gear 18. In this position the electric units are connected in the same manner as for reverse. The brake 34 is held disengaged and the solenoid 38 is energized to move the lever 31 to the right and release the gear unit. Torque reaction on the driven shaft tends to hold the gear carrier stationary so that the sun gear 19 will be driven in reverse at an accelerated speed to turn the armature 16 backward. Under these conditions the second electric unit functions as a generator and the first electric unit operates as a motor tending to turn the drive shaft forward. The torque of the first electric unit will, therefore, be added to engine torque on the driving shaft to produce a typical regenerative circuit, driving the driven shaft forward at high torque and relatively low speed. It will be seen that this driving condition provides an infinitely variable ratio drive so that the driven shaft will be picked up smoothly at high torque and will have its speed increased gradually. This provides a very desirable starting condition with high torque ratios and relatively high efficiency.

Upon turning the wiper arm 35 clockwise to the next step to position PF, it will engage only the segment 36. In this position the brake 34 engages, the electric units are disconnected and the solenoid 38 is energized to release the gear unit. It will be observed that even though the electric units are disconnected, the first electric unit may continue to operate as a generator to supply current to energize the solenoid as well as for battery charging and the like. At this time, the one-way brake 32 holds the sun gear 19 against reverse rotation and the ring gear 18 is driven forward mechanically through the clutch 24. The gear carrier will, therefore, be turned forward at a predetermined mechanical ratio which is fixed by the relative size of the gears to provide a mechanical step drive. This ratio is highly desirable for hill climbing and like conditions and provides extremely high mechanical efficiency.

When the arm 35 is turned to the next position shown at F, it engages the segment 36 to release the gear unit and the contact 46 to energize the solenoid 44. This moves the reversing switch 43 to the right to change the connections between the electric units so that the first electric unit will operate as a generator connected in series with the second electric unit which will function as a motor. Under these conditions, the second electric unit tends to turn the sun gear 19 forward overrunning the brake 32 to provide a two path non-regenerative drive which is infinitely variable from the fixed mechanical ratio to a ratio of substantially 1:1.

For direct mechanical drive, the wiper may be shifted further in a clockwise direction to position D to engage a contact button 61 connected to the solenoid 39. In this position, the electric units are again disconnected and the valve sleeve 28 is shifted to the left to the position shown in Figure 1 to close the exhaust port and open the inlet port of the gear unit. At this time the gear unit is locked to function as a clutch directly connecting the driving and driven shafts.

During all of the drive positions, except the mechanical intermediate step and the direct drive position, the brake 15 will be engaged to hold the armature 14 stationary so that the second electric unit can function properly. If desired, this brake may be controlled electrically through the control unit or may be separately operated. While the controls have been described as being manually operable, they may, if preferred, be made automatic by providing springs 62 which tend to hold the brakes 34 and 15 against turning. As the reactive forces on these springs and on the brakes 15 and 34 change in response to different driving conditions, the springs may turn the brakes to operate switches, indicated at 63, which may be utilized to control movement of the wiper 35 from one driving position to the next. For example, when the transmission is operating in regenerative low gear, the brake 15 tends to be dragging rearwardly with a force depending upon the resistance of the driven shaft. When this force decreases, the switch 63 may close to energize a coil 15a acting on a core 35a connected to the wiper arm 35 to move the wiper arm 35 to the next position for mechanical intermediate drive. At this time torque reaction on the sun gear tends to turn the brake 34 rearward and may be opposed by the spring 62. As this torque reaction decreases, the spring 62 may turn the brake 34 forward to close the switch 63 to energize a coil 34a acting on the core 35a to move the wiper arm 35 to the next forward position for non-regenerative two path drive. In this way an automatic change may be effected through the several forward drive positions.

The embodiment of the invention shown in Figure 3 operates hydraulically rather than electrically, but provides many of the advantages of the electric construction so far described. As shown in Figure 3, a drive shaft 70 is connected to the impeller 71 of a fluid torque converter. The torque converter includes spaced sets of rotor vanes 72 connected to sleeve 73 and a stator 74 held against reverse rotation by a one-way brake 75 arranged between the rotor vanes. The sleeve 73 is connected through a clutch 76 to a ring gear 77 of a planetary differential gear set, and a one-way brake 78 is provided to hold the ring gear 77 against reverse rotation. The gear set is completed by an elongated set of planet pinions 79 on a carrier 81 which is connected to a driven shaft 82. The pinions 79 mesh with the ring gear 77 and with a sun gear 83. An idler gear 84 connects the pinions 79 with a second sun gear 85.

The sun gear 83 is connected through a sleeve 86 to a clutch member 87 and the sun gear 85 is connected through a shaft 88 to a second clutch member 89 adjacent the member 87. A clutch member 91 connected to the driving shaft is normally held in engagement with the clutch member 89 by a spring 92 and is adapted to be shifted into engagement with the clutch member 87 by a speed responsive unit 93 carried by the drive shaft. For starting, the clutch 76 is engaged and the clutch member 91 is in the position shown to connect the drive shaft to the sun gear 85. At this time, the sun gear 85 is turned forward by the drive shaft, and the ring gear 77 is turned forward at variable speed and torque ratios through the hydraulic torque converter. Due to the reverse gear 84, the ring gear tends to turn the sun gear 85 forward so that a typical regenerative circuit is provided for starting. After the speed responsive unit 93 has shifted the clutch member 91 to the right into engagement with the clutch member 87, the clutch 76 may be disengaged to provide a positive intermediate drive. Under these conditions the sun gear 83 is driven forward by the drive shaft and the ring gear 77 is held against reverse rotation by the one-way brake 78 so that the carrier 81 will be turned forward through the gear set at a positive mechanical ratio.

For two path non-regenerative drive, the clutch 76 may be re-engaged with the member 91 still in engagement with the member 87. At this time both the sun gear 83 and the ring gear 77 are driven forward to drive the gear carrier forward through a two path non-regenerative torque circuit at ratios varying in infinite steps from the fixed gear ratio up to substantially 1:1.

For direct mechanical drive a speed responsive clutch member 94 may be provided to connect the sleeve 86 directly to the ring gear 77 so that the gear unit will be locked and torque will be transmitted directly through mechanical connections through the driving shaft to the driven shaft. It will be understood that the speed responsive unit 94 is set to engage at a substantially higher speed than that at which the unit 93 operates.

For reverse driving a brake 95 may be provided to engage the ring gear 77 and hold it against forward rotation. Since the reverse operation starts at low speed, the clutch member 91 will be in engagement with the member 89 to drive the sun gear 85 forward. Due to the idler gear 84, this operation will cause the carrier 81 to be driven in a reverse direction at reduced speed.

In both embodiments of the invention, the differential gears are hooked up with the infinitely variable torque transmitting means in two broadly different manners. In the first hook-up which is employed for starting the gear set is so connected as to produce a regenerative circuit in which a part of the power flowing through the gears is fed back to the driving shaft to aid the prime mover. This type of hook-up is characterized by the facts that the sum of the power flowing through the gear paths is greater than the power input from the prime mover or the power output taken from the driven shaft, and that the output torque ratio is always greater than the momentary torque ratio of the infinitely variable transmission unit. However, this form of hook-up tends to reduce the efficiency below that of the infinitely variable transmission unit employed. For example, if the infinitely variable unit has an efficiency of 85%, the overall efficiency of the transmission will always be below the 85% efficiency of the variable unit.

In the second type of hook-up which provides two parallel paths of power flow, the connections are non-regenerative so that none of the power flowing through the paths is fed back to aid the prime mover. A hook-up of this type is characterized by the facts that the total power passing through the two paths never exceeds the input power and that the output torque ratio is always less than the momentary torque ratio of the infinitely variable unit. For example, if the infinitely variable unit has an efficiency of 85%, the overall efficiency will exceed 85%.

While two embodiments of the invention have been shown and described in detail, it will be understood that they are illustrative only and are not intended to be a definition of the scope of the invention, reference being had for this purpose to the appended claims.

What is claimed is:

1. A transmission for connecting driving and driven shafts comprising a planetary differential gear set having a plurality of relatively rotatable elements, one of said elements being connected to the driven shaft, clutch means to connect another of the elements to the driving shaft, a one-way brake to hold a third of the elements against rotation in one direction, infinitely variable torque multiplying means connecting said third element to the driving shaft, and control means for the torque multiplying means and the clutch means operable in one position to render the one-way brake ineffective thereby to cause the third element to drive the torque multiplying means and through it the driving shaft forward, in a second position to render the torque multiplying means ineffective thereby to disconnect the driving shaft from the third element, and in a third position to render the torque multiplying means effective to cause the driving shaft to drive the third element forward.

2. A transmission for connecting driving and driven shafts comprising a planetary differential gear set, having a plurality of relatively rotatable elements, means to connect one of the elements to the driving shaft, means to connect another of the elements to the driven shaft, infinitely variable torque transmitting means having a driving unit and a driven unit to operatively connect the driving shaft to a third element of the gear set, the torque transmitting means initially having its driving unit connected to the third element and its driven unit connected to the driving shaft so that it tends to turn the driving shaft forward through the torque transmitting means to produce a regenerative action, a one-way brake connected to said third element to hold it against reverse rotation, means to disconnect the torque transmitting means and to make the one-way brake effective to produce a positive gear drive, and means to connect the driving unit of the torque transmitting means to the driving shaft and the driven unit to the third element so that the driving shaft will tend to turn said third element forward through the torque transmitting means to produce a two path variable ratio drive.

3. A transmission for connecting driving and driven shafts comprising a planetary differential gear set, having a plurality of relatively rotatable elements, means to connect one of the elements to the driving shaft, means to connect another of the elements to the driven shaft, infinitely variable torque transmitting means having a driving unit and a driven unit to operatively connect the driving shaft to a third element of the gear set, the torque transmitting means initially having its driving unit connected to the third element and its driven unit connected to the driving shaft so that it tends to turn the driving shaft forward through the torque transmitting means to produce a regenerative action, a one-way brake connected to said third element to hold it against reverse rotation, means to disconnect the torque transmitting means and to make the brake effective to produce a positive gear drive, means to connect the driving unit of the torque transmitting means to the driving shaft and the driven unit to the third element so that the driving shaft will tend to turn said third element forward to produce a two path variable ratio, and means to lock the gear set to produce a direct mechanical drive.

4. A transmission to connect driving and driven shafts comprising a pair of electric units, a planetary differential gear set, one of the electric units being connected to the driving shaft to be driven thereby, means to connect one element of the gear set to the driving shaft, another element of the gear set being connected to the other electric unit, a third element of the gear set being connected to the driven shaft, control means for the electric units having one position in which said other unit acts as a generator and said one unit acts as a motor tending to turn the driving shaft forward, means to hold said other element against rotation to produce a positive gear drive, the electric units being disconnected by the control means when the last named means is effective, and the control means having another position in which said one unit acts as a generator and said other unit acts as a motor to turn said other element forward.

5. A transmission to connect driving and driven shafts comprising a pair of electric units, a planetary differential gear set, one of the electric units being connected to the driving shaft to be driven thereby, means to connect one element of the gear set to the driving shaft, another element of the gear set being connected to the other electric unit, a third element of the gear set being connected to the driven shaft, means inclosing the gears of the gear set whereby they form a fluid pump having fluid inlet and exhaust ports, control means to connect the electric units whereby one acts as a generator and the other as a motor to transmit power between the driving shaft and said other element of the gear set, and a valve to close the exhaust port and open the inlet port of the gear set to lock it for direct drive.

6. A transmission to connect driving and driven shafts comprising a pair of electric units, a planetary differential gear set, one of the electric units being connected to the driving shaft to be driven thereby, means to connect one element of the gear set to the driving shaft, another element of the gear set being connected to the other electric unit, a third element of the gear set being connected to the driven shaft, means inclosing the gears of the gear set whereby they form a fluid pump having fluid inlet and exhaust ports, a valve to control the ports, control means for the electric units having one position in which said other unit acts as a generator and said one unit acts as a motor to drive the driving shaft forward, a one-way brake to hold said other element of the gear set against reverse rotation, the control means having a second position in which the electric units are disconnected when the one-way brake is effective, and means to shift the valve to a position to close the exhaust port and open the inlet port to lock the gear set for direct drive.

7. A transmission to connect driving and driven shafts, comprising a pair of electric units, a planetary differential gear set, one of the electric units being connected to the driving shaft to be driven thereby, means to connect one element of the gear set to the driving shaft, another element of the gear set being connected to the other electric unit, a third element of the gear set being connected to the driven shaft, means inclosing the gears of the gear set whereby they form a fluid pump having fluid inlet and exhaust ports, a valve to control the ports, control means for the electric units having one position in which said other unit acts as a generator and said one unit acts as a motor to drive the driving shaft forward, a one-way brake to hold said other element of the gear set against reverse rotation, the control means having a second position in which the electric units are disconnected when the one-way brake is effective, the control means having a third position in which said one unit acts as a generator and said other unit acts as a motor to drive said other element of the gear set forward, and means to move the valve to a position to close the exhaust port and open the inlet port to lock the gear set for direct drive.

8. A transmission to connect driving and driven shafts comprising a pair of electric units, a planetary differential gear set, one of the electric units being connected to the driving shaft to be driven thereby, means to connect one element of the gear set to the driving shaft, another element of the gear set being connected to the other electric unit, a third element of the gear set being connected to the driven shaft, control means for the electric units shiftable to different positions to connect the units in different ways, said means connecting one element of the gear set to the driving shaft being disconnectible, and means to hold said one element against rotation when it is disconnected from the driving shaft and to energize said other electric unit to drive said other element of the gear set in a reverse direction to produce reverse drive.

9. A transmission to connect driving and driven shafts comprising a pair of electric units, a planetary differential gear set, one of the electric units being connected to the driving shaft to be driven thereby, means to connect one element of the gear set to the driving shaft, another element of the gear set being connected to the other electric unit, a third element of the gear set being connected to the driven shaft, controllable brake means to hold said other element against reverse rotation, electrically controlled operating means for the brake means, means inclosing the gears of the gear set whereby it forms a fluid pump having inlet and outlet ports, a valve controlling the port, electric operating means for the valve, and control means shiftable to different positions to control the connections between the electric units for different driving conditions and to control both of said operating means.

10. A transmission for connecting driving and driven shafts comprising a planetary differential gear set having a plurality of relatively rotatable elements, one of said elements being connected to the driven shaft, clutch means to connect another of the elements to the driving shaft, a one-way brake to hold a third of the elements against rotation in one direction, infinitely variable torque multiplying means connecting said third element to the driving shaft, and control means for the torque transmitting means, the clutch means and the one-way brake operable in one position to disconnect the clutch means, to make the one-way brake ineffective and to connect the torque multiplying means to be driven by the third element and to drive the driving shaft forward; in a second position to connect the clutch means, make the one-way brake effective and make the torque multiplying means ineffective; and in a third position to connect the clutch means and to connect the torque multiplying means to be driven by the driving shaft and to drive the third element forward.

11. A transmission to connect driving and driven shafts comprising a pair of electric units, a planetary differential gear set, one of the electric units being connected to the driving shaft to be driven thereby, means to connect one element of the gear set to the driving shaft, another element of the gear set being connected to the other electric unit, a third element of the gear set being connected to the driven shaft, control means for the electric units having one position in which said other unit acts as a generator and said one unit acts as a motor tending to turn the driving shaft forward, means to hold said other element against rotation to produce a positive gear drive, the electric units being disconnected by the control means when the last named means is effective, and the control means having another position in which said one unit acts as a generator and said other unit acts as a motor to turn said other element forward, and clutch means directly to connect the elements of the gear set to produce a direct drive therethrough.

12. A transmission to connect driving and driven shafts comprising a pair of electric units, a planetary differential gear set, one of the electric units being connected to the driving shaft to be driven thereby, means to connect one element of the gear set to the driving shaft, another element of the gear set being connected to the other electric unit, a third element of the gear set being connected to the driven shaft, control means for the electric units having one position in which said other unit acts as a motor tending to turn the driving shaft forward, means to hold said other element against rotation to produce a positive gear drive, the electric units being disconnected by the control means when the last named means is effective, the control means having another position in which said one unit acts as a generator and said other unit acts as a motor to turn said other element forward, and the control means having a fourth position in which said one element of the gear set is disconnected from the driving shaft, said one electric unit acts as a generator and said other unit acts as a motor tending to turn said other element of the gear set in a reverse direction.

ADIEL Y. DODGE.

REFERENCES CITED

The following references are of record in the file of this patent:

UNITED STATES PATENTS

| Number | Name | Date |
| --- | --- | --- |
| 968,290 | Thomas | Aug. 23, 1910 |
| 1,203,664 | Thomas | Nov. 7, 1916 |
| 1,293,646 | Kurtz | Feb. 4, 1919 |
| 1,442,908 | Ripley | Jan. 23, 1923 |
| 1,700,078 | Rydberg | Jan. 22, 1929 |
| 1,870,076 | Thomson | Aug. 2, 1932 |
| 1,992,210 | Higley | Feb. 26, 1935 |
| 2,000,465 | Higley | May 7, 1935 |
| 2,018,336 | Weichsel | Oct. 22, 1935 |
| 2,045,197 | Neuland | June 23, 1936 |
| 2,050,185 | Kibler | Aug. 4, 1936 |
| 2,085,763 | Neuland | July 6, 1937 |
| 2,301,451 | Pollard | Nov. 10, 1942 |
| 2,334,394 | Dodge | Nov. 16, 1943 |
| 2,339,269 | James | Jan. 18, 1944 |

FOREIGN PATENTS

| Number | Country | Date |
| --- | --- | --- |
| 18,954 | Great Britain | of 1913 |
| 22,377 | Great Britain | of 1908 |